May 18, 1926.

J. MARCOUX

MECHANICAL TOY

Filed Sept. 4. 1925

1,585,197

INVENTOR
JOHN MARCOUX
By Featherstonhaugh & Co
ATTORNEYS

Patented May 18, 1926.

1,585,197

UNITED STATES PATENT OFFICE.

JOHN MARCOUX, OF SAPPERTON, BRITISH COLUMBIA, CANADA.

MECHANICAL TOY.

Application filed September 4, 1925. Serial No. 54,516.

My invention relates to improvements in mechanical toys which has for its particular objects the providing of suitable exercise for a child, and the imparting of lifelike action to a model horse.

The invention consists essentially of a sulky harnessed to a horse, the legs of the horse being actuated by one wheel upon which the horse is carried and the vehicle driven by ratchet means actuated by the user, as will be more fully described in the following specification, in which:—

In the drawings like characters of reference indicate corresponding parts in each figure.

Figure 1:
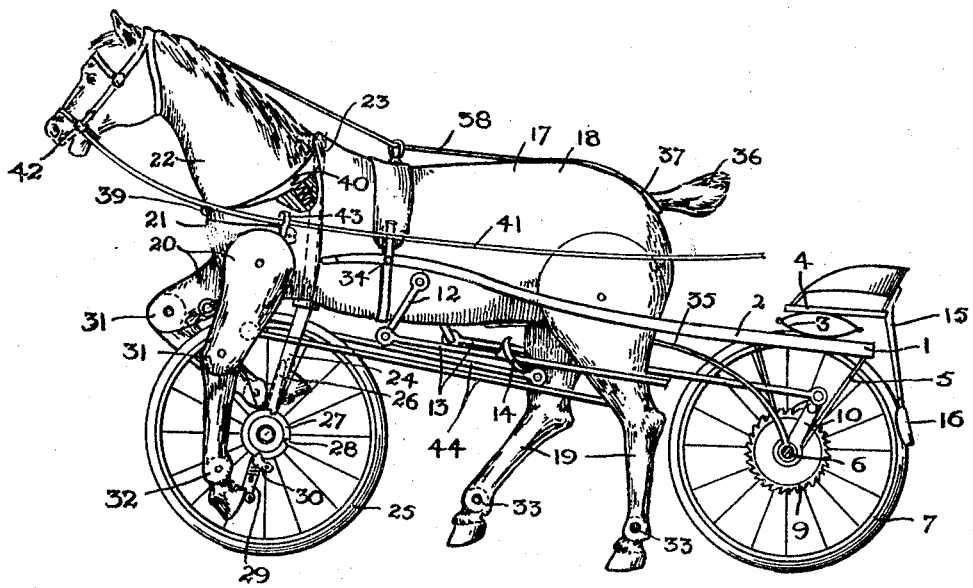
Fig. 1 is a general view of the invention part in section showing one wheel removed.
Figure 2:
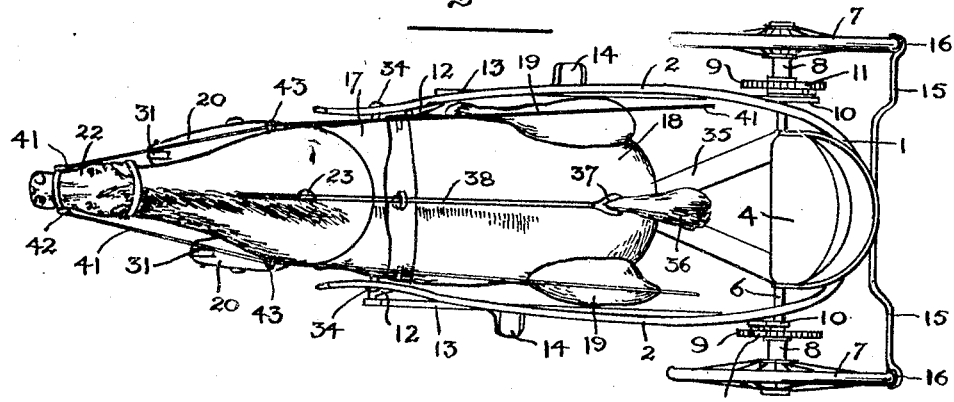
Fig. 2 is a plan view showing the hinging of the shoulders and head of the horse to its body.

The numeral 1 indicates generally a sulky having a pair of shafts 2 upon which a pair of springs 3 are mounted for the purpose of supporting the driver's seat 4. The numeral 5 indicates a pair of brackets supporting the shafts 2 from the axle 6. 7 indicates a pair of road wheels each of which are freely mounted on the axle and are connected by sleeves 8 to ratchet wheels 9. 10 indicates a pair of rocking levers which are provided with a pawl 11 having operative engagement with the ratchet wheels. The numeral 12 indicates a pair of cranks pivotally mounted upon the body of the horse, and 13 are connecting rods extending from the free ends of the cranks to the upper ends of the rocking levers 10. On each of these rods a pedal 14 is secured which is engaged by the feet of the child to actuate the rods to impart rotary movement to the road wheels. Secured to the rear of the seat 4 is a pair of rigid brake arms 15 having brake shoes 16 at their outer ends which are adapted to engage the tires of the wheels 7 as the seat is tilted back upon the spring 3 by the action of the child. The numeral 17 indicates generally a horse, having a body 18, rear legs 19, front legs 20, a forepart 21 and a head 22, the forepart of the body is housed into the body portion 18 and is mounted upon a steering column 23 shown in dotted line, which is suitably supported from the body portion 18, this forepart is semi-cylindrical in plan so as to permit of its being turned to one side or the other without detracting from the general contour and appearance of the horse. Extending downwards from the steering column 23 is a pair of forks 24, between which a steering wheel 25 is mounted, secured to the axle of the steering wheel on one side thereof, is a crank 26 shown in dotted line in Figure 1, secured to the axle on the opposite side of the wheel is a disc 27 having ratchet notches 28 disposed 90 degrees apart. Freely mounted on the axle adjacent the disc 27 is a crank 29 having a spring pressed pawl 30 which is adapted to engage any of the ratchet notches 28 of the disc 27. The pawl 30 is so tensioned that by imposing a minor resistance to the rotation of the crank 29 the pawl will disengage from one notch of the disc and will engage with one of the other notches, so that the cranks may be set diametrically opposite to each other as shown in Figure 1, or at right angles to each other, the front legs 20 are jointed at the knees as at 31 and at the fetlocks as at 32, the hoofs of the front legs being separately connected to the free ends of the cranks 26 and 29 so that as the wheel 25 rotates, action is imparted to every joint of the forelegs in a similar manner to the natural action of a horse, the rear legs 19 are pivotally connected to the body and are jointed also at the fetlocks as at 33, so that the hoofs are free to swing and come into contact with the ground in a perfectly natural manner. The body of the horse is pivotally connected as at 34 to the shafts 2 and is supported from the axle by a bifurcated spring plate 35 so that the body 18 is permitted a certain limited movement in a vertical direction to permit of satisfactory contact being established between the hoofs of the rear legs 19 and the ground, thus again simulating the natural action of a horse. The numeral 36 indicates a tail which is engaged by a crupper 37 secured to a check rein 38 extending to the horse's head 22. The head 22 is hingedly connected to the breast of the forepart 21 as at 39 and is provided with a spring portion 40 housed in the forepart for the purpose of pressing the head forward to the extent permitted by the check rein 38. The numeral 41 indicates a pair of reins connected to the bit 42 and extending through a pair of loops 43 on the shoulders, which are disposed at the rear of the fulcrum of the head 22, so that as tension is applied to the reins the horse's head is drawn back against the spring 40 and as such tension is relieved the head is thrust forward, thereby, and the tightening of the check rein 38 causes the tail to be slightly raised.

The numeral 44 indicates a pair of rods pivotally connected at their forward ends to the upper part of the front legs and at their opposite ends to the upper part of the hind legs, so that as action is imparted to the front legs 20 simultaneous action is imparted to the rear legs 19.

While I have shown both right legs connected together by one rod 44 and both left legs by the other rod, I may prefer to cross the rods so that the right front and left hind leg are connected by one rod and the left front leg and right hind leg are connected by the other rod, thus imparting a different action to the legs from that resulting from the present rod arrangement.

What I claim as my invention is:

1. A mechanical toy comprising a horse mounted upon a steering wheel and a sulky mounted upon road wheels, means for imparting rotation to the wheels of the sulky, shafts to the sulky between which the horse's body is pivotally mounted intermediate its length and a resilient support for the rear portion of the horse.

2. A mechanical toy comprising a horse mounted upon a steering wheel and a sulky mounted upon road wheels, said horse having front legs jointed at the knees and fetlocks, cranks carried by the steering wheel having operative connection to the lower jointed member of said front legs whereby natural action is imparted to the legs as the wheel is rotated.

3. A mechanical toy comprising a horse mounted upon a steering wheel and a sulky mounted upon road wheels, said steering wheel having an axle and a pair of cranks operably connected to the lower jointed member of the front legs, and means for disposing the cranks in varying positions to each other.

4. A mechanical toy comprising a horse mounted upon a steering wheel and a sulky mounted upon road wheels, said steering wheel having an axle and a pair of cranks operably connected to the lower jointed member of the front legs, one of said cranks being secured to the axle and the other crank being freely mounted thereupon, and means for establishing a driving connection between the wheel and the said second named crank at different positions radially of the axle.

5. A mechanical toy comprising a horse mounted upon a steering wheel and a sulky mounted upon road wheels, pedal means for propelling the vehicle, a seat to the sulky, and means as the seat is tilted for exerting a resistance to rotation of the road wheels.

6. A mechanical toy comprising a wheeled vehicle and a horse, said horse having its forepart hingingly connected to the body, and said body being mounted upon a steering wheel, reins extending from the head of the horse whereby the steering wheel is turned, and means as tension is applied to the reins for raising the horse's head.

7. A mechanical toy comprising a wheeled vehicle and a horse, said horse having its forepart hingingly connected to the body, and said body being mounted upon a steering wheel, reins extending from the head of the horse whereby the steering wheel is turned, and means as tension is applied to the reins for raising the horse's head and depressing the horse's tail.

8. A mechanical toy comprising a horse mounted upon a steering wheel and a sulky having an axle and a pair of road wheels, said wheels being freely mounted upon the axle, a ratchet wheel connected to each road wheel and pedal actuated means for independently engaging each ratchet wheel to impart rotation to the road wheels.

Dated at Vancouver, B. C., this 27th day of August, 1925.

JOHN MARCOUX.